US007024259B1

(12) United States Patent
Sporer et al.

(10) Patent No.: US 7,024,259 B1
(45) Date of Patent: Apr. 4, 2006

(54) SYSTEM AND METHOD FOR EVALUATING THE QUALITY OF MULTI-CHANNEL AUDIO SIGNALS

(75) Inventors: Thomas Sporer, Fuerth (DE); Roland Bitto, Nuremberg (DE); Karlheinz Brandenburg, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/889,697

(22) PCT Filed: Dec. 15, 1999

(86) PCT No.: PCT/EP99/09979

§ 371 (c)(1), (2), (4) Date: Oct. 19, 2001

(87) PCT Pub. No.: WO00/44196

PCT Pub. Date: Jul. 27, 2000

(51) Int. Cl.
*G06F 17/00* (2006.01)
*H04R 5/02* (2006.01)

(52) U.S. Cl. ......................... 700/94; 381/303; 381/307

(58) Field of Classification Search ................ 381/307, 381/303, 300, 309, 310, 26; 700/94
See application file for complete search history.

(56) References Cited

U.S. PATENT DOCUMENTS 6,118,875 A * 9/2000 M.o slashed.ller et al. ..... 381/1
6,223,090 B1 * 4/2001 Brungart ...................... 700/28
6,271,771 B1 * 8/2001 Seitzer et al. ................. 341/50

FOREIGN PATENT DOCUMENTS

| | | | |
|---|---|---|---|
| DE | WO9823130 | * | 5/1998 |
| EP | 196 47 399 | | 11/1996 |
| JP | 0165733 | * | 12/1985 |

* cited by examiner

*Primary Examiner*—Vivian Chin
*Assistant Examiner*—Andrew Flanders
(74) *Attorney, Agent, or Firm*—Michael A. Glenn; Glenn Patent Group

(57) ABSTRACT

A system for evaluating the quality of an audio test signal derived from an audio reference signal by coding and decoding, said audio test signal and said audio reference signal each comprising a plurality of channels, comprises a unit for converting the audio reference signal into a first audio reference sum signal at a first reference point and into a second audio reference sum signal at a second reference point and for converting the audio test signal into a first audio test sum signal at the first reference point and into a second audio test sum signal at the second reference point, the audio reference sum signals and the audio test sum signals at the first and second reference points being a superposition of the respective channels, which can be emitted by a plurality of loudspeakers, weighted with a respective transfer function between the respective loudspeaker and the reference point in question, and a unit for evaluating the quality of the audio test sum signals while taking into consideration the audio reference sum signals so as to provide an indication of the quality of the audio test signal. The system according to the present invention permits real rooms and an arbitrary number of channels of the audio test signal to be taken into account so as to execute a listening-adapted evaluation of the quality of a specific coding/decoding method.

21 Claims, 3 Drawing Sheets

SYSTEM AND METHOD FOR EVALUATING THE QUALITY OF MULTI-CHANNEL AUDIO SIGNALS

FIELD OF THE INVENTION

The present invention relates to quality evaluation and in particular to a System and method for evaluating the quality of multi-channel audio signals.

BACKGROUND OF THE INVENTION AND PRIOR ART

Since listening-adapted digital coding methods have been standardized, they have been used to an increasing extent. Examples for such cases of use are the digital compact cassette, the minidisk, digital terrestrial radio broadcasting and the digital video disk. When coding is effected by means of listening-adapted coding methods, artificial products or artifacts may, however, occur, which did not occur in analog audio signal processing.

For judging or evaluating a specific encoder, listening test with test persons were carried out in the past. Although the average result provided by such listening tests is comparatively reliable, there is still a subjective component. Furthermore, listening tests executed with a certain number of test persons are comparatively complicated and therefore comparatively expensive. Hence, measurement methods have been developed for a listening-adapted evaluation of audio signals.

Such a measurement method is described e.g. in DE 196 47 399 C1. The method of listening-adapted quality evaluation described in this publication models all non-linear hearing effects onto a reference signal as well as onto a test signal. The listening-adapted quality evaluation is carried out by means of a comparison in the cochlear domain. In so doing, the excitations caused in the ear by the test signal and by the reference signal are compared. For this purpose, both the audio reference signal and the audio test signal are divided into their spectral components by a filter bank. By means of a large number of filters whose frequencies overlap, a sufficient resolution with respect to time as well as frequency is guaranteed. Hence, a mono audio test signal, which is derived from an audio reference signal by coding and subsequent decoding, can be evaluated with regard to its quality.

The measurement method described in DE 196 47 399 D1 also permits an evaluation of the quality of stereo signals, i.e. two-channel signals. For this purpose, non-linear preprocessing is carried out with the left and with the right channel of the audio test signal and of the audio reference signal; this preprocessing emphasizes transients in a frequency-selective manner and reduces stationary signals. In particular, different detections of the error probability are carried out with the left channel of the audio reference signal and with the left channel of the audio test signal as input signals, with the right channel of audio reference signal and with the right channel of the audio test signal as input signals, with the left channel of the preprocessed audio reference signal and with the left channel of the preprocessed audio test signal as input signals and with the right channel of the preprocessed audio reference signal and with the right channel of the preprocessed audio test signal as input signals so as to obtain a measure of the quality of the stereophonic audio test signal.

A disadvantage of the known method for listening-adapted quality evaluation of audio signals is the fact that the stereo ability is limited to a reproduction by headphones alone. In other words, the audio test signal which enters the ear of a listener is compared with the audio reference signal which enters the ear of a listener. This means that effects produced by a room, such as reflections on the walls, on the ceiling and on the floor, multiple reflections, attenuations, etc., are not taken into account. Furthermore, known quality-evaluating methods are not able to take into account any directional characteristic of the human ear, i.e. it makes no difference whether a signal comes from the rear, from the front or from the side. Known measurement methods are only applicable to headphone reproduction in the case which the acoustic signal is emitted by the headphone loudspeaker, which is normally arranged directly on the ear, and is introduced in the ear or the quality-evaluating process.

The known method is also disadvantageous insofar as a listening-adapted quality evaluation of multi-channel signals, such as e.g. 5-channel signals, which become more and more common and which are known under the headword “Dolby surround”, has been absolutely impossible up to now.

SUMMARY OF THE INVENTION

It is the object of the present invention to provide an improved concept for evaluating the quality of audio signals in the case of which room effects are additionally taken into account.

In accordance with a first aspect of the invention, this object is achieved by a system for evaluating the quality of an audio test signal derived from an audio reference signal by coding and decoding, said audio test signal and said audio reference signal each comprising a plurality of channels, each channel being adapted to be made audible by one loudspeaker of a plurality of loudspeakers which are positioned at different positions in an at least fictitious room, and two listening reference points being defined with respect to the positions of the plurality of loudspeakers, said system comprising: a unit for converting the audio reference signal into a first audio reference sum signal at the first reference point and into a second audio reference sum signal at the second reference point and for converting the audio test signal into a first audio test sum signal at the first reference point and into a second audio test sum signal at the second reference point, the audio reference sum signals and the audio test sum signals at the first and second reference points being a superposition of the respective channels, which can be emitted by said plurality of loudspeakers, weighted with a respective transfer function between the respective loudspeaker and the reference point in question; and a unit for evaluating the quality of the audio test sum signals while taking into consideration the audio reference sum signals so as to provide an indication of the quality of the audio test signal.

In accordance with a second aspect of the invention, this object is achieved by a method for evaluating the quality of an audio test signal derived from an audio reference signal by coding and decoding, said audio test signal and said audio reference signal each comprising a plurality of channels, each channel being adapted to be made audible by one loudspeaker of a plurality of loudspeakers which are positioned at different positions in an at least fictitious room, and two reference points being defined with respect to the positions of the plurality of loudspeakers, said method comprising the following steps: converting the audio reference signal into a first audio reference sum signal at the first reference point and into a second audio reference sum signal at the second reference point; converting the audio test signal into a first audio test sum signal at the first reference point and into a second audio test sum signal at the second reference point; weighting the respective channels, which can be emitted by said plurality of loudspeakers, with a respective transfer function between the respective loudspeaker and the reference point in question; superimposing the weighted channels at said first and at said second reference point so as to obtain the audio reference sum signals and the audio test sum signals; and conducting the audio test sum signals and the audio reference sum signals to a unit for evaluating the quality of the audio test sum signals while taking into consideration the audio reference sum signals so as to obtain an indication of the quality of the audio test signal.

The present invention is based on the finding that, although signals comprising an arbitrary number of channels exist, the human listener, who counts in the final analysis, always has only two ears at his disposal. Directional hearing is caused by the different impulse responses for different incidence directions of sound signals into the human ear. The different impulse responses for different incidence directions are referred to as "head-related transfer functions" in the field of technology. In reality, there are not only the direct sound paths between the ear and the loudspeaker, but reflections on the walls, on the ceiling and on the floor occur as well. This can be summarized as room impulse response. The HRTFs and the room impulse response lead, in combination, to a change of sound which can, according to the present invention, also be evaluated by measurement systems without explicit modelling of binaural effects, such as different masking thresholds for binaural signals in comparison with monaural signals, perception of phase shifts, precedence effects, etc.

When audio signals are evaluated by means of listening tests, standardized listening rooms, which have been standardized e.g. according to ITU-R BS.1116, are normally used. The size, the loudspeaker arrangement and the reverberation time are largely determined in this case. When a more comprehensive quality evaluation of audio signals is carried out in accordance with the present invention, both the head-related transfer functions (HRTFs) as well as the room impulse responses can be taken into account. For the listening-adapted quality evaluation according to the present invention it is, furthermore, of no importance whether a signal is a stereo signal which is emitted by two loudspeakers for the left and for the right channel, or whether the signal is a multi-channel signal comprising e.g. five channels and emitted by five loudspeakers which are positioned with respect to a listener e.g. in such a way that the loudspeakers are arranged at the rear left, front left, rear right, front right and at the front.

The quality-evaluating system according to the present invention comprises for this purpose a unit for converting the audio reference signal into a first audio reference sum signal at a first reference point and into a second audio reference sum signal at a second reference point and a unit for converting the audio test signal into a first audio test sum signal at the first reference point and into a second audio test sum signal at the second reference point, the audio reference sum signals and the audio test sum signals at the first and second reference points being a superposition of the respective channels, which can be emitted by the plurality of loudspeakers, weighted with a respective transfer function between the respective loudspeaker and the reference point in question. The audio reference sum signals and the audio test sum signals are finally fed into a quality-evaluating unit so as to obtain an indication for the quality of the audio test signal. The quality-evaluating unit can be an arbitrary known unit of the type disclosed e.g. in DE 196 47 399 C1 or of the type specified in the international standard ITU-R BS 1387 (PEAQ).

The method according to the present invention is advantageous with regard to the fact that, when the audio signal is a stereo signal, the influences of the listening room on the signal propagation from each loudspeaker to each reference point, i.e. each ear, can be taken into account.

Another advantage is to be seen in the fact that the method is applicable to audio signals comprising an arbitrary number of channels, since the channels are converted into two sum signals via respective transfer functions modelling the propagation of a signal from one loudspeaker to one ear, in such a way that an arbitrary quality-evaluating method, which is suitable for two channels, can be used.

Normally, the individual transfer functions can be gained by measurement making use of built-in microphones with an artificial head or of probe microphones with a human listener. The method according to the present invention will, however, be particularly advantageous when the head-related transfer functions of arbitrary persons are already known and can e.g. be downloaded via the internet from a suitable server. In this case, the room impulse response which occurs in a listening room and which can be measured or simulated can be convoluted with a specific existing HRTF so as to obtain a transfer function. This will be advantageous especially in cases where the listening room does not yet exist, i.e. where the acoustic properties of a room are simulated prior to actually constructing the room so as to simulate the acoustic properties when e.g. concert halls or sound studios are planned and so as to optimize the listening room already prior to its construction.

BRIEF DESCRIPTION OF THE DRAWINGS

In the following, preferred embodiments of the present invention will be explained in detail making reference to the drawings enclosed, in which.

DETAILED DESCRIPTION OF THE PREFERRED EMBODIMENTS

Figure 1:
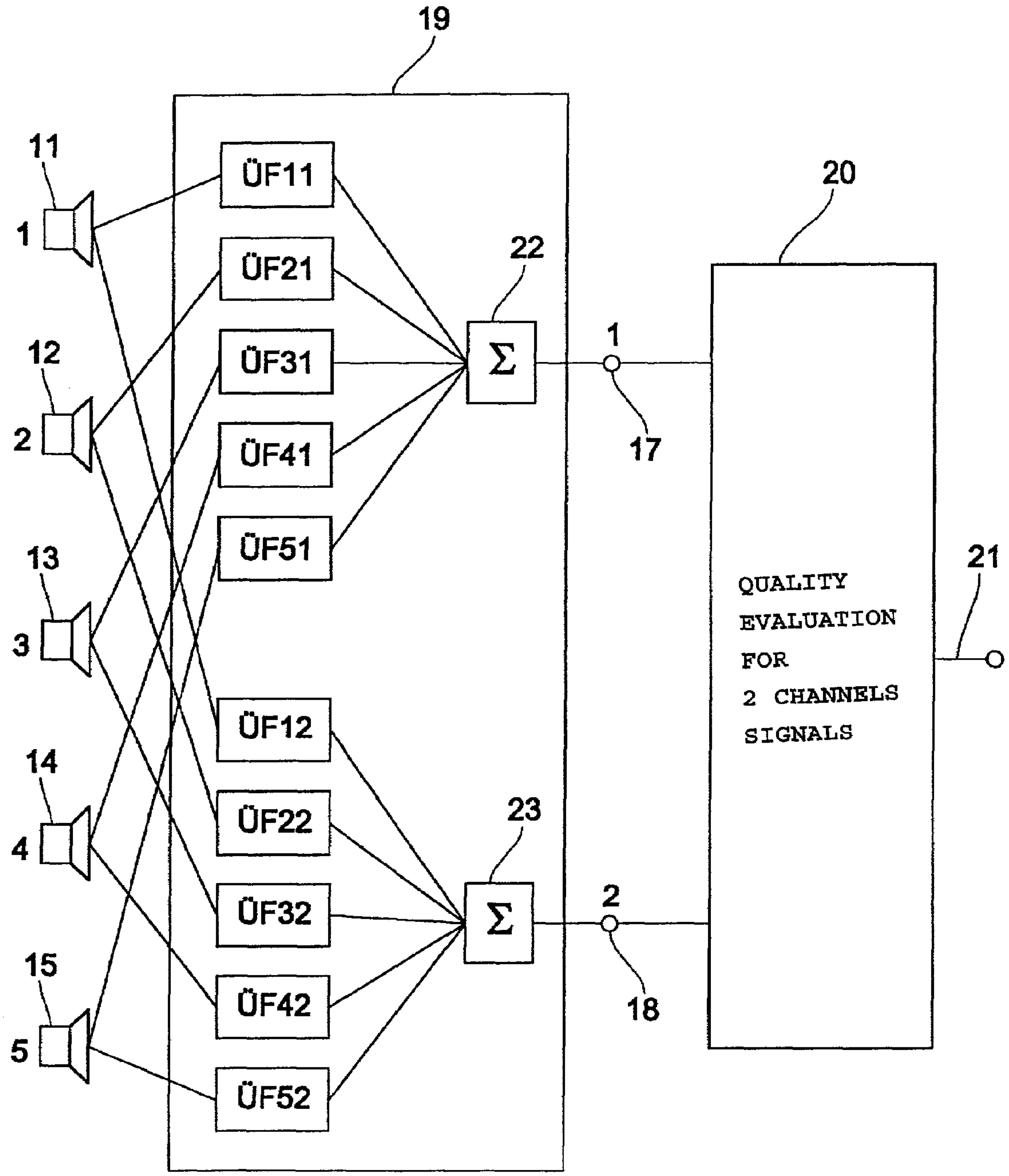
FIG. 1 shows a schematic block diagram of a system according to the present invention.

FIG. 1 shows a schematic block diagram of a system for evaluating the quality of an audio test signal derived from an audio reference signal by coding and decoding. The audio test signal and the audio reference signal each comprise a plurality of channels; each channel can be made audible by one loudspeaker of a plurality of loudspeakers 11 to 15 which are positioned at different positions in an at least fictitious room, two reference points 17, 18 for simulating the hearing being defined with respect to the positions of the plurality of loudspeakers 11 to 15. The quality-evaluating system includes a unit 19 for converting the audio reference signal into a first audio reference sum signal at the first reference point 17 and into a second audio reference sum signal at the second reference point 18 and for converting the audio test signal into a first audio test sum signal at the first reference point 17 and into a second audio test sum signal at the second reference point 18, the audio reference sum signals and the audio test sum signals at the first and second reference points 17, 18 being a superposition of the respective channels which can be emitted by said plurality of loudspeakers 11 to 15, weighted with a respective transfer function OF11 to OF52 between the respective loudspeaker 11 to 15 and the reference point 17, 18 in question. The quality-evaluating system additionally includes a unit 20 for evaluating the quality of the audio test sum signals while taking into consideration the audio reference sum signals so as to provide an indication of the quality of the audio test signal at an output 21.

In the following, the conversion unit 19 will be explained. This unit comprises a plurality of transfer functions OF11 to OF52, which are either the HRTFs, when an anechoic room, i.e. a room in which no reflections occur, is considered, or which are the whole transfer function of the room from one of the loudspeakers are weighted with the respective transfer functions. The output signals produced when the input signals are weighted with the respective transfer functions are added by means of a first adder 22 so as to obtain first audio sum signals. Analogously, a second adder 23 is provided for the second reference point 18 so as to add the output signals of the transfer functions from the respective loudspeakers 11 to 15 to the second reference point 18 so as to provide the second audio sum signals. It goes without saying that the audio test signal as well as the audio reference signal are processed by means of the conversion unit 19 in such a way that the same conditions prevail for both the audio reference signal and the audio test signal in such a way that the unit 20 for evaluating the quality of 2-channel signals will only measure the quality of coding/decoding and that no other effects will disturb the measurement result.

Although FIG. 1 shows the situation for a 5-channel audio signal, the system according to the present invention is also applicable to stereo signals comprising only two channels or to signals comprising three, four or more than five channels. In this case, it will only be necessary to add or to omit respective transfer functions. Furthermore, it should be pointed out that the positioning of the loudspeakers in FIG. 1 is only schematic. A correct positioning of the loudspeakers with respect to the reference points is shown in FIGS. 2 and 3 for a 5-channel signal example.

With respect to the notation of the individual transfer functions reference should be made to the fact that the first figure always refers to the loudspeaker, whereas the second figure refers to the reference point, i.e. reference point No. 1 (17) or reference point No. 2 (18).

Figure 2:
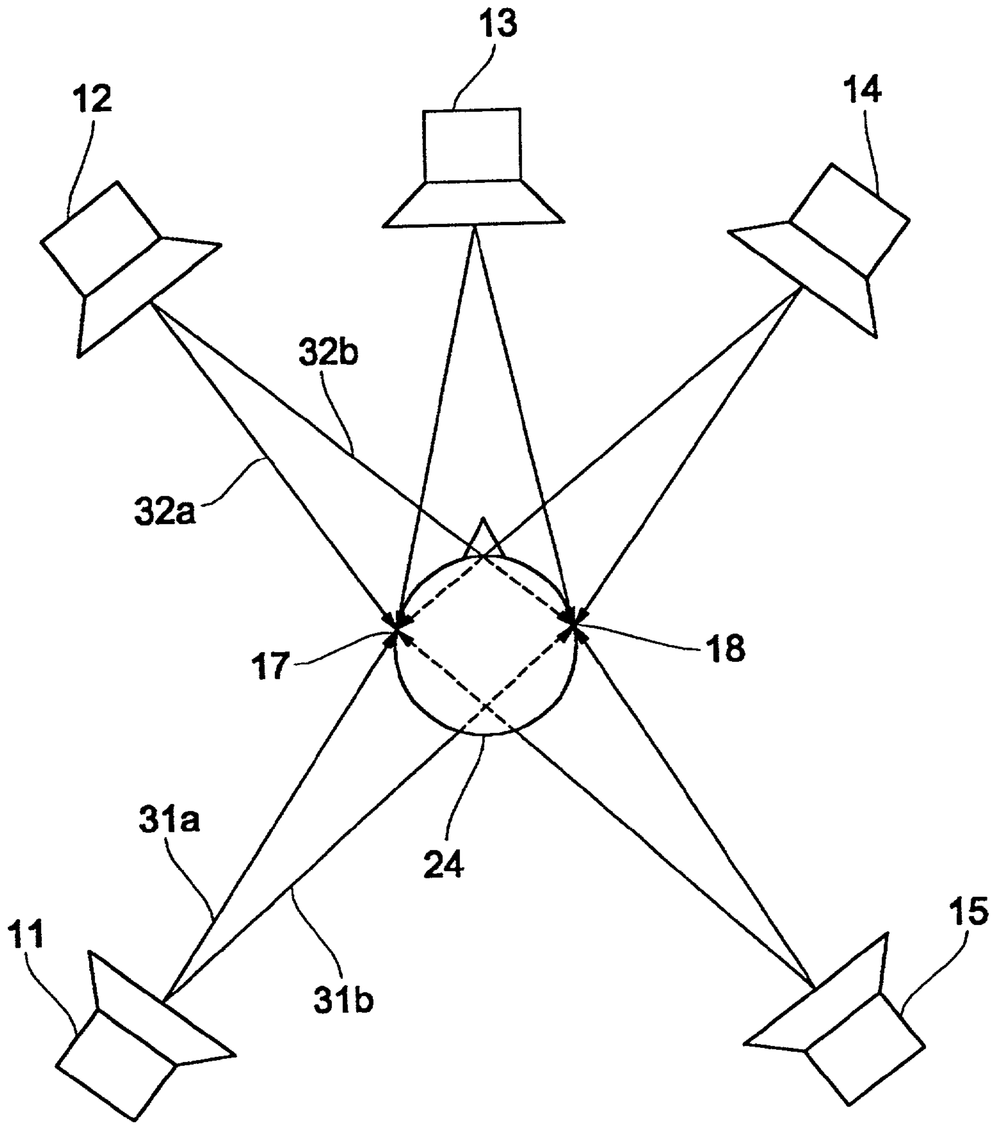
FIG. 2 shows a schematic diagram for determining the head-related transfer functions (HRTFs)
Figure 3:
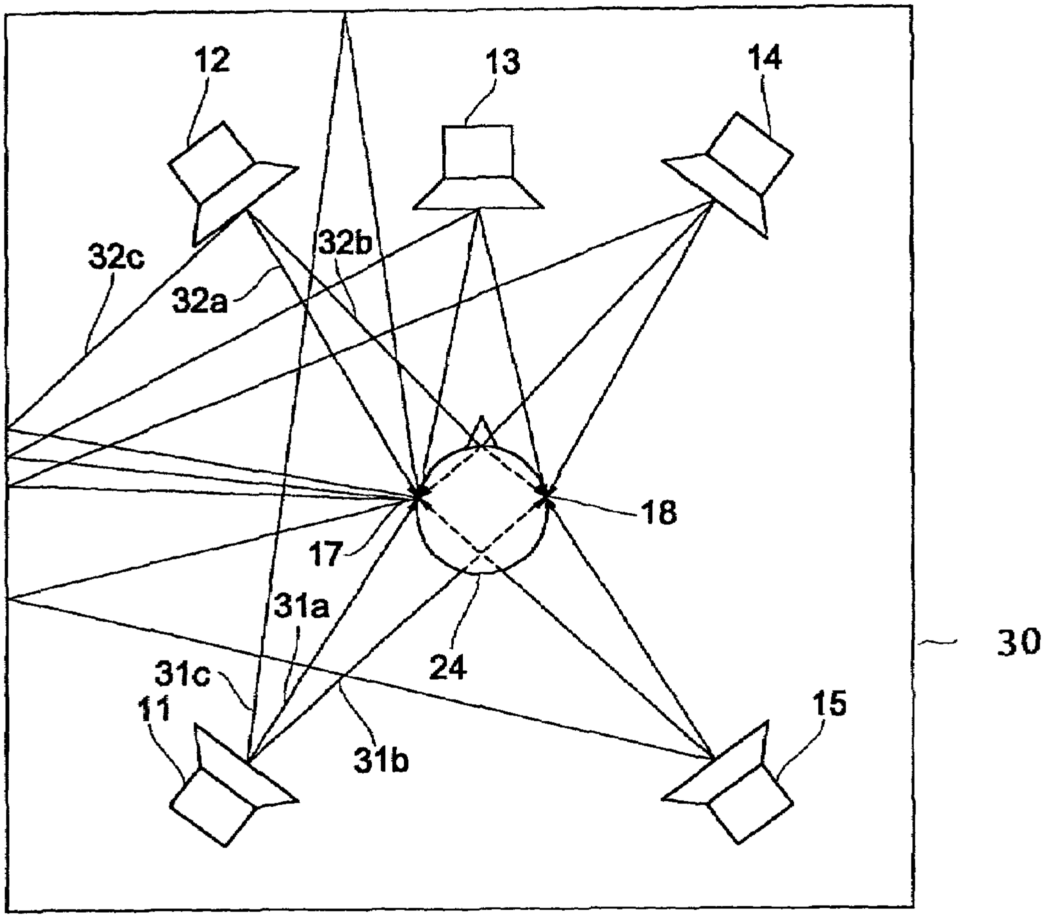
FIG. 3 shows a schematic block diagram for representing the situation in a real listening room.

FIG. 2 shows a possible arrangement of the five loudspeakers 11 to 15 with respect to a listener 24 whose head is schematically shown in FIG. 2 in a top view. Alternatively, the head 24 may be an artificial head. In any case, the head 24 comprises the first reference point 17 and the second reference point 18, i.e. the ears 17, 18 in the case of a human listener or the built-in microphones 17, 18 in the case of an artificial head 24. In FIG. 2, transmission paths in the anechoic room from each of the loudspeakers 11 to 15 to each reference point 17, 18 are depicted. The head-related transfer functions (HRTFs) are determined by screening e.g. the head or the shoulders of the person listening and by different transmission times. Arrow 31*a*, for example, represents the transmission path from the first loudspeaker 11 to the first reference point 17. Arrow 31*b*, which is depicted in the form of a broken line in the area of the head 24, represents the HRTF from the first loudspeaker 11 to the second reference point 18. Analogously, arrow 32*a* represents the transfer function from the second loudspeaker 12 to the first reference point, i.e. OF21 in FIG. 1. Arrow 32*b* represents in a corresponding manner the transfer function from the second loudspeaker 12 to the second reference point 18, i.e. OF22 in FIG. 1. By adding the sub-signals of the loudspeaker output signals, which have been weighted with the respective transfer function, at the reference points 17, 18, the first and second audio test sum signals and audio reference turns signals are then obtained; these audio test sum signals and audio reference sum signals can then be fed into an arbitrary quality-evaluating unit 22 for 2-channel signals so as to obtain a measure of the quality of the audio test signal, which is a 5-channel signal in the case shown in FIG. 2.

As has already been mentioned, the scenario in FIG. 2 shows how the head-related transfer functions are gained in the anechoic room. This means that, when the HRTFs are gained by measurement, the room must be of such a nature that no sound reflectors exist within the room, i.e. that the whole room must be provided with a sound absorbing lining.

FIG. 3 shows a schematic representation of transmission paths in a listening room 30 in which the loudspeakers 11, 12, 13, 14, 15 are arranged in the same way as in FIG. 2. In addition to the direct sound, an indirect path from each loudspeaker to the left ear 17 is shown here. Reference should be made to the fact that the scenario in FIG. 3 does not fully reflect the reality, since reflections occur here on all the walls, the floor and the ceiling and since multiple reflections exist as well. In detail, the first loudspeaker 11 additionally emits sound which, as shown by a line 31*c*, is reflected on the front wall of the room 30, propagates from the front wall and arrives at the first reference point 17. It follows that the transfer function from the first loudspeaker 11 to the left ear 17, i.e. OF11 in FIG. 1, models not only direct sound propagation 31*a* from the loudspeaker to the ear but also sound propagation by means of a reflection 31*c* from the first loudspeaker 11 to the first ear 17. Analogously, there is also an indirect path, which is indicated by an arrow 32*c*, from the second loudspeaker 12 to the first ear 17. This means that the transfer function OF21 in FIG. 1 from the second loudspeaker 12 to the first reference point 17 models not only direct sound propagation 32*a* but also sound propagation by means of reflection to the first ear 17.

In the following, the determination of the individual transfer functions OF11 to Of52 (FIG. 1) will be explained. There are various possibilities of determining these transfer functions.

The first possibility is to position the loudspeakers 11 to 15 relative to the reference points 17 and 18 in the manner shown in FIG. 3. Subsequently, the first loudspeaker 11 is excited by means of an excitation signal, whereupon the sound signal arriving at the first reference point 17 is measured at this reference point; considering FIG. 3, this sound signal is a superposition of the signals 31*a*, 31*c*. In addition, the sound signal at the second reference point 18 is measured; this sound signal could be a superposition of signal 31*b* and of a signal which is not shown in FIG. 3 and which is emitted by the first loudspeaker 11 and reflected on some wall or other in such a way that it arrives at the second reference point 18.

The transfer function from the first loudspeaker to the first reference point 17 (OF11 in FIG. 1) can be calculated from the excitation signal and from the sound signal measured at the first reference point 17. If the loudspeaker 11 is excited by means of an ideal pulse, the respective impulse response, which describes the transmission of the sound signal in the time domain, will be obtained directly at the reference points. In view of practical restrictions, this is, however, only a theoretical method, whereas, in practice, the loudspeaker 11 is excited by a pseudo-noise signal. This method is repeated for the additional loudspeakers 12 to 15 in such a way that all the additional transfer functions OF21 to OF52 can be determined from the measured sound signal at the respective reference point and from the excitation signal at the respective loudspeaker.

If, as has been stated, such measurements take place in a real space with non-absorbing walls, etc., the whole transfer function, which comprises the room impulse response and the head-related transfer functions (HRTFs) for the individual loudspeaker positions, will be determined directly. If such measurements are carried out in an anechoic room, i.e. in a fully sound-absorbing room, the HRTFs can be determined directly in this way; these HRTFs are then the transfer functions OF11 to OF52.

Irrespectively of whether the measurement is carried out by means of two built-in microphones and an artificial head or by means of two probe microphones and a test person, such sound measurements are complicated and expensive not least in view of the very expensive probe microphones.

If, however, head-related transfer functions (HRTFs) are known for specific persons or also for an "average person", these head-related transfer functions can be used for being convoluted with the impulse response of a room; this impulse response can also be simulated. In this case, no measurements will be necessary for determining the transfer functions OF11 to OF52. A substantial advantage of this method is that it can also be used for simulating rooms which have not yet been constructed so as to design e.g. a sound studio for an optimum sound propagation for specific loudspeaker configurations prior to actually constructing this sound studio. It follows that, in this case, it can no longer be said that the room in which the quality of a coded and subsequently decoded audio test signal is to be evaluated actually exists. Instead, the room only exists in a simulated form and is therefore a fictitious room.

Irrespectively of whether the room actually exists or whether it only exists as a fictitious room on the basis of a simulation, it is normally assumed that test persons are seated or stand in such a listening room, which may e.g. be a standardized listening room, at the best possible listening position. However, many test persons move their head to the front, to the rear, to the left or to the right while the test is taking place; this is also referred to as translation. In addition, the persons will normally move slightly away from the optimum listening position, i.e. they move their heads to the left and to the right, this being also referred to as bearing movements or rotation. Hence, a possibly existing middle loudspeaker, i.e. the loudspeaker 13, will no longer be located precisely in the middle. This happens because the directional perception is often unsure precisely at the front. In particular, the front and the back are confused in many cases. This is also referred to as "front-back confusion" in the field of technology. Making reference to FIGS. 2 and 3, it can be seen that the first reference point 17 and the second reference point 18 change with respect to the fixed positions of the loudspeakers in the case of each movement of the head.

In order to cope with this situation, the quality-evaluating method carried out by the quality-evaluating system shown in FIG. 1 is executed for a plurality of positions of the reference points 17, 18, whereupon various quality indications for the different positions will be obtained. It goes without saying that for each of the different positions of the reference points 17, 18 different transfer functions must be ascertained and used when the method according to the present invention is being executed. The output obtained will then be a plurality of quality indications for different positions of the reference points 17, 18, i.e. for different head positions.

Various possibilities exist for evaluating the different quality indications. On the one hand, an average value can be assumed so as to be able to make a general statement to the effect that a certain coding/decoding method may perhaps be optimal, if the position of the head is not changed at all, or that this method is less advantageous than some other coding method in the case of certain translations or bearing movements or rotations of the head.

On the other hand, the "worst case" of the individual measurements can be found out so as to be able to make a statement whether a certain coding/decoding method is sub-optimal in the case of a specific position of the head with respect to the five loudspeakers when 5-channel audio signals are processed. It will be advantageous to carry out such quality evaluations for a plurality of positions of the reference points 17, 18 close to the optimum reference listening position on the one hand. On the other hand, such measurements can also be carried out for other sites which are not located at the reference listening position so that e.g. certain other seats in a sound studio can be judged so as to find out whether or not coding/decoding errors can be heard there.

The above description shows clearly that the system according to the present invention and the method according to the present invention provide existing quality-evaluating systems and methods with a substantial amount of flexibility in such a way that is not only possible to evaluate the quality of audio signals with more than two channels but that it is also possible to act out quality evaluations for different scenarios of positioning the reference points 17, 18 relative to the loudspeakers 11 to 15, and that the system according to the present invention and the method according to the present invention can even be used for designing sound studios or other listening rooms, such a cinemas, so as to be able to carry out a listening-adapted evaluation of the quality of specific coding/decoding methods in a specific room. Furthermore, the method according to the present invention and the system according to the present invention can be used for designing listening rooms so that the optimum coding method among a large number of possible coding methods can be selected for a specific room.

The transfer functions OF11–OF52 can be realized in the field of circuit technology in different ways. Preferably, they are realized through an FIR filter for each impulse response. Reference should be made to the fact that for large rooms the FIR filters may have a considerable length; in the case of a sampling frequency of 48 kHz their length may e.g. exceed 100,000 sampling values. In this case, it will be advisable to represent the first milliseconds of this length, where the reflections occurring are primarily discrete reflections, more precisely than the time domain towards the end of the filter, where the reflections occurring are primarily diffuse reflections.

What is claimed is:

1. A system for evaluating the quality of an audio test signal derived from an audio reference signal by coding and decoding, said audio test signal and said audio reference signal each comprising a plurality of channels, each channel being adapted to be made audible by one loudspeaker of a plurality of loudspeakers which are positioned at different positions in an at least fictitious room, and two listening reference points being defined with respect to the positions of the plurality of loudspeakers, said system comprising:

a unit for converting the audio reference signal into a first audio reference sum signal at the first reference point and into a second audio reference sum signal at the second reference point and for converting the audio test signal into a first audio test sum signal at the first reference point and into a second audio test sum signal at the second reference point, wherein the first and the second reference points are different from each other, wherein the unit for converting includes:

a weighting device for weighting each channel using a respective transfer function between the respective loudspeaker and the reference point in question to obtain weighted channels, and an adding device for each reference point, the adding device for the first reference point being adapted to add weighted channels generated using transfer functions between the loudspeakers and the first reference point, and the adding device for the second reference point being adapted to add weighted channels generated using transfer functions between the loudspeakers and the second reference point so as to obtain an audio reference sum signal and an audio test sum signal for each reference point; and a unit for evaluating the quality of the audio test sum signals output by the adding devices while taking into consideration the audio reference sum signals output by the adding devices so as to provide an indication of the quality of the audio test signal.

2. A system according to claim 1, wherein the transfer functions between the respective loudspeakers and the respective reference points are individual head-related transfer functions so as to take into account the different impulses response for different sound incidence directions into the human ear.

3. A system according to claim 1, wherein the transfer functions between the respective loudspeakers and the respective reference points are mean head-related transfer functions (HRTFs) obtained by averaging a large number of individuals.

4. A system according to claim 1, wherein the transfer function between the respective loudspeaker and the respective reference point is a transfer function which corresponds to a convolution of a head-related transfer function with a room impulse response in such a way that sound reflections of a room in which the plurality of loudspeakers and the two reference points are positioned are taken into account.

5. A system according to claim 1, wherein the transfer functions between the respective loudspeakers and the respective reference points are averaged transfer functions which are a result of averaging individual transfer functions between fixed loudspeaker positions and varying positions of the reference points.

6. A system according to claim 1, wherein said conversion unit is arranged for providing transfer functions for various positions of said first and second reference points with respect to fixed loudspeaker positions) and wherein the quality-evaluating unit is arranged for providing the indication of the quality of the audio test signal for various transfer functions and for providing the positions of the reference points for the indication of the poorest quality.

7. A system according to claim 1, wherein the room is a standardized reference listening room and wherein the two reference points simulate auditory organs of a test person at a reference listening position.

8. A system according to claim 1, wherein the room is a sound studio and wherein the two reference points simulate auditory organs of a test person at an arbitrary seated/standing position in said room.

9. A system according to claim 5, wherein the different positions of the first and second reference points deviate only slightly from a reference position so as to simulate a bearing movement of a test person.

10. A system according to claim 5, wherein the different positions of the first and second reference points deviate markedly from the reference position so as to simulate a rotation of the head of a test listener.

11. A system according to claim 1, wherein the audio test signal comprises eve channels, said five channels being a left rear, a right rear, a left front, a right front and a middle front channel.

12. A system according to claim 1, wherein the audio test signal is a stereo signal.

13. A system according to claim 1, wherein the weighting device comprises an FIR filter for each loudspeaker/reference-point combination, the filter coefficients of each FIR filter being determined by the transfer function of the transmission path from the respective loudspeaker to the respective reference point:

wherein the adding device for the first reference point includes a first adder for adding the output signals of the FIR filters, which represent transmission paths to the first reference point, so as to provide the first audio test sum signal and the first audio reference sum signal, respectively; and wherein the adding device for the second reference point includes a second adder for adding the output signals of the FIR filters, which represent a transmission path to the second reference point, so as to provide the second audio test sum signal and the second audio reference sum signal, respectively.

14. A method for evaluating the quality of an audio test signal derived from an audio reference signal by coding and decoding, said audio test signal and said audio reference signal each comprising a plurality of channels, each channel being adapted to be made audible by one loudspeaker of a plurality of loudspeakers which are positioned at different positions in an at least fictitious room, and two reference points being defined with respect to the positions of the plurality of loudspeakers, said method comprising the following steps:

converting the audio reference signal into a first audio reference sum signal at the first reference point and into a second audio reference sum signal at the second reference point, wherein the first and the second reference points are different from each other;

converting the audio test signal into a first audio test sum signal at the first reference point and into a second audio test sum signal at the second reference point;

the step of converting including a step of weighting the each channels, which is emittable by said plurality of loudspeakers, using a respective transfer function between the respective loudspeaker and the reference point in question; and a step of adding weighted channels generated using transfer functions between the loudspeakers and the first reference point and a step of adding weighted channels generated using transfer functions between the loudspeakers and the second reference point so as to obtain an audio reference sum signal and an audio test sum signal for each reference point; and conducting the audio test sum signals and the audio reference sum signals to a unit for evaluating the quality of the audio test sum signals while taking into consideration the audio reference sum signals so as to obtain an indication of the quality of the audio test signal.

15. A method according to claim 14, wherein the following step precedes the step of converting:

obtaining the individual transfer functions between each loudspeaker and each reference point.

16. A method according to claim 15, wherein the step of obtaining comprises the following sub-steps:

exciting a loudspeaker with an excitation signal;

measuring the signal at each reference point;

determining the transfer function between the excited loudspeaker and the first reference point;

determining the transfer function between the excited loudspeaker and the second reference point; and repeating the steps of exciting, measuring and determining until all the loudspeakers have been excited so as to obtain the individual transfer functions.

17. A method according to claim 16, wherein the first and second reference points are the ears of a human listener, which are provided with probe microphones.

18. A method according to claim 16, wherein the first and second reference points are built-in microphones of an artificial head.

19. A method according to claim 16, wherein the excitation signal is pseudo-noise signal.

20. A method according to claim 15, wherein the step of obtaining comprises the following sub-steps:

accessing a head-related transfer function for a determined positioning of a loud-speaker relative to the first reference point;

determining the room impulse response for the position of the loudspeaker in the room;

convoluting the head-related transfer function with said room impulse response so as to obtain the transfer function from said loudspeaker to the first reference point;

repeating the steps of accessing, determining and convoluting so as to obtain the transfer function from said loudspeaker to the second reference point; and executing the steps of accessing, determining, convoluting and repeating for each additional loudspeaker so as to obtain all the individual transfer functions.

21. A method according to claim 19, wherein the room impulse response is determined by simulating the room.

* * * * *